Patented Dec. 22, 1953

2,663,664

UNITED STATES PATENT OFFICE 2,663,664

MITICIDAL DIHYDRAZIDE COMPOSITION

Jacob Shore, Buffalo, N. Y., assignor to Mathieson Chemical Corporation, a corporation of Virginia No Drawing. Application July 11, 1950,
Serial No. 173,250

4 Claims. (Cl. 167—22)

My invention relates to improvements in the control of mites and red spiders and to improvements in the general effectiveness of agricultural insecticidal compositions. It provides improved insecticidal compositions to which have been imparted specific miticidal activity without phytotoxic effect and an improved method for controlling and eliminating mites such as red spiders, European red mites and citrus mites by way of example.

One of the major defects of many currently available insecticides is that in spite of general effectiveness, they are specifically without action or have only slight action against the red spiders and other members of the class Arachnida. For example, DDT (dichlorodiphenyltrichloroethane) while effective against many insects, is ineffective against red spiders. Its use may even increase the seriousness of attack on plants by the spiders since the DDT destroys other insects which normally feed on the red spiders and keep them under control.

In the art of controlling pests, the agents used must not only be effective in killing the pests or rendering them inactive but must also be without phytotoxic action on the host plants. This is particularly important since many compounds have been tested and found effective against pests but they also act as herbicides. Such materials are of no economic value since the only purpose in destroying the pests is to preserve the host.

According to the present invention, specific miticidal activity without phytotoxic effect is imparted to insecticidal compositions by dispersing a small proportion of a moderately water-soluble acyclic dihydrazide of an aliphatic dicarboxylic acid such as adipic acid in an insecticidal carrier medium such as a powder or aqueous spray solution. With particular advantage, the powder or solution contains a compatible conventional insecticide of more general action so that combined insecticidal activity of greater extent is obtained. In terms of the method aspect of my invention, a dilute dispersion in either the form of powdered or liquid admixture or in solution of a small proportion of the acyclic dihydrazide is formed, and the dispersion is applied to plants. I have found that the moderately water-soluble aliphatic dihydrazides, for example adipic dihydrazide, have surprising activity in dispersed form in protecting plants against mites and red spiders even though they appear to be ineffective against other common organisms such as aphids, milkweed bugs, Mexican bean beetles and the southern army worm and are without apparent phytotoxic action at effective dilutions. The non-fungicidal and non-phytotoxic properties of the hydrazides are surprising since a well-known phytotoxic substance is the so-called maleic hydrazide, which however has the cyclic imide structure:

Hence, the compositions of my invention contain as an essential active ingredient an acyclic dihydrazide of an aliphatic dicarboxylic acid. The dihydrazide of adipic acid having the formula (—$CH_2$—$CH_2CONHNH_2$)$_2$ is particularly valuable in its combination of miticidal activity without phytotoxic action. It is sufficiently water soluble to form aqueous solutions in the required dilution. It is apparently absorbed by plants in further extension of its effectiveness without phytotoxic consequences. This material is representative of dihydrazides of other aliphatic dicarboxylic acids, such as glutaric, pimelic, suberic and sebacic (sebacic acid is a 10 carbon atom acid). Succinyl and malonyl dihydrazides (malonic acid is a 3 carbon atom acid) have good activity but they tend to show increasing phytotoxicity.

The useful hydrazides impart specific miticidal activity when dispersed or dissolved in dusts and aqueous solutions. Examples of useful powders include both wettable powders and dusts containing pyrophyllite, talc, finely divided clay, kieselguhr, gypsum, chalk and the like. The powdered materials advantageously include or comprise an active insecticide of more general utility such as DDT, benzene hexachloride, toxaphene, rotenone, nicotine, or finely divided sulfur. Because of the apparent significance of water solubility in effecting control of mites, it is advantageous to add a hygroscopic agent, e. g. glycerine or ethylene glycol, to the dust compositions. When dispersed in aqueous solution, suspending, wetting or emulsifying agents, such as an alkylated aryl polyether alcohol or an alkyl aryl sulfonate are advantageously employed. As the molecular weight of the hydrazide increases up to sebacic acid dihydrazide, for example, the miticide imparting agents tend to become water insoluble so that they should be mechanically or chemically dispersed in aqueous media. The dispersions may comprise aqueous emulsions in which the hydrazide, advantageously together with a compatible insecticide of complementary activity, is dissolved in an organic solvent such as refined kerosene, alcohol, acetone, benzene or xylene and dispersed in aqueous emulsion with the aid of an emulsifying agent.

The proportions of miticide imparting agent employed according to my invention are small, of the order of about 0.5 to 5 weight per cent. For example, aqueous dispersions of 2 per cent concentration have been found to be particularly effective spray solutions.

The hydrazide dispersions and solutions may be applied in the conventional way as by spraying. As noted above, the solutions advantageously will contain one or more additional insecticides and/or fungicides. For example, an aqueous spray emulsion may contain DDT and dispersed finely divided sulfur, the sulfur acting to control apple scab, the hydrazide to kill red spiders and the DDT to kill other common organisms. In similar manner the hydrazide may be dispersed in a powdered composition and applied to plants so as to control a variety of pests.

The usefulness of the new compositions of my invention and of the general method of application will be illustrated in the following examples. In the examples adipic dihydrazide is employed as representative of other hydrazides and the particular compositions described are spray solutions. The preparation of dispersions in other forms and containing other materials will be obvious from the above description.

*Example I*

Cranberry bean plants were infected with greenhouse red spiders and sprayed with various concentrations of adipic dihydrazide in aqueous solution containing one part in five thousand of Triton X-155 a polyoxyethylene phenol ether as wetting agent. The plants were sprayed until the solution dripped off the leaves. Using a 2 per cent concentration of adipic dihydrazide and repeating the treatment after three days in one case and after five days in a second case, the plants were found to be substantially free of red spiders when observed after 2, 9 and 12 days. Very few spiders were able to migrate to new leaves indicating that a high degree of control was obtained. Using the same concentration of dihydrazide, control with very little migration was noted after 12 days even when the plant was sprayed only once. Almost as good results were obtained using a spray having a concentration of 1 per cent of adipic dihydrazide and fair results were obtained using 0.5 per cent of active ingredient. In a check run, the dihydrazide was omitted and the Triton solution applied. Under these conditions the red spiders were not affected and migrated freely to new leaves.

*Example II*

The procedure of Example I was repeated with the exception that the plants were sprayed first and subsequently infected with red spiders. Under these conditions the red spiders were only slightly less effectively controlled, fair results being obtained in two to five days but with very satisfactory results after 10 days. The 0.5 per cent concentration of dihydrazide gave comparatively poor results with moderate migration of the spiders. Again the check on the Triton solution alone gave no control whatever.

*Example III*

Cranberry bean plants infected with greenhouse red spiders were dipped in a 2 per cent solution of adipic dihydrazide containing 0.5 per cent of "Nacconol" an alkyl aryl sulfonate as a wetting agent. One group of plants was dipped once and showed fair to good control with substantially no migration. When the plants were dipped twice at either 3- or 5-day intervals, excellent control was obtained and no migration occurred. Under the same conditions a check without the dihydrazide in the "Nacconol" solution showed no action whatever and the organisms migrated freely.

I claim:

1. A composition having miticidal activity which consists essentially of a dispersion of about 0.5 to 5 weight per cent of an acyclic dihydrazide of an aliphatic dicarboxylic acid in an inert compatible powder as a carrier, said acid being saturated, unsubstituted and straight chain, and containing from 3 to 10 carbon atoms.

2. A composition having miticidal activity which consists essentially of a dispersion of about 0.5 to 5 weight per cent of adipic dihydrazide in an inert compatible powder as a carrier.

3. The method of controlling mites and red spiders which comprises dispersing an acyclic dihydrazide of an aliphatic dicarboxylic acid in an insecticidal carrier medium and applying the dispersion to plants, said acid being saturated, unsubstituted and straight chain, and containing from 3 to 10 carbon atoms.

4. The method of controlling mites and red spiders which comprises dispersing adipic dihydrazide in an insecticidal carrier medium and applying the dispersion to plants.

JACOB SHORE.

References Cited in the file of this patent

Curtius: Journal für praktische Chemie, Band 199, Neue Folge 91, pages 3 to 5 (1915).

Bushland: Journal Economic Entomology, volume 33, pages 669 to 676, August 1940.